United States Patent [19]

Matsuda

[11] Patent Number: 4,467,355
[45] Date of Patent: Aug. 21, 1984

[54] FREEZE-PICTURE TRANSMISSION APPARATUS

[75] Inventor: Akio Matsuda, Tokyo, Japan
[73] Assignee: Nippon Electric Co., Ltd., Tokyo, Japan
[21] Appl. No.: 342,685
[22] Filed: Jan. 26, 1982
[30] Foreign Application Priority Data Jan. 28, 1981 [JP] Japan .................. 56-11212

[51] Int. Cl.³ .............................................. H04N 7/12
[52] U.S. Cl. ................... 358/134; 358/146; 358/183
[58] Field of Search ........... 358/85, 134, 142, 146, 358/147, 22, 183; 179/2 TV, 1 CN

[56] References Cited
U.S. PATENT DOCUMENTS

| | | | |
|---|---|---|---|
| 2,895,005 | 7/1959 | Kock et al. | 358/134 |
| 3,761,610 | 9/1973 | Krallinger et al. | 358/280 |
| 3,848,084 | 11/1974 | Rodda et al. | 358/134 |
| 4,099,258 | 7/1978 | Parsons | 358/147 |
| 4,184,048 | 1/1980 | Alcaide | 179/1 CU |
| 4,266,242 | 5/1981 | McCoy | 358/22 |

FOREIGN PATENT DOCUMENTS 53-32611 3/1978 Japan .................. 358/147

OTHER PUBLICATIONS

Imai et al., Development of Color Freeze Picture Transmission System, NEC Research & Dev., No. 43, pp. 1-13, Oct. 1976.

*Primary Examiner*—Joseph A. Orsino, Jr.
*Attorney, Agent, or Firm*—Sughrue, Mion, Zinn, Macpeak and Seas

[57] ABSTRACT

The public telephone line has a bandwidth insufficient for the rapid transmission of video signals. A long time period is required therefore. The present invention improves this long transmission time.

The freeze-picture transmission apparatus according to the present invention receives a plurality of video signals in a predetermined order. The received one is compressed and stored in memory. The read-out from the memory is done at a speed corresponding to a bandwidth of the transmission line. The compressed video signal read-out from the memory is transmitted to the reception unit. In the reception unit, the compressed video signal transmitted is once stored in another memory. The read-out from another memory is done at a TV scanning speed. The compressed video signal read-out from another memory is displayed by TV.

10 Claims, 8 Drawing Figures

FREEZE-PICTURE TRANSMISSION APPARATUS

BACKGROUND OF THE INVENTION

The present invention relates to a freeze-picture transmission apparatus and, more particularly, to a freeze-picture transmission apparatus in which four video signals of four pictures are transmitted in a conventional one-picture video signal transmission period.

In a freeze-picture transmission apparatus according to the prior art, a carrier wave frequency-modulated or amplitude-modulated with a television video signal corresponding to a one field picture is transmitted through a narrow band public telephone line or a data communication line. In order to transmit a television signal on real time, the transmission line is required to have a bandwidth of about 5 MHz. However, the public telephone line transmits a signal only in a frequency band of 0.3 kHz to 3.4 kHz. In other words, the public telephone line only has a bandwidth of about 1.6 kHz at most. Therefore, it is necessary to convert the time axis of the video signal for transmission through the narrow band public telephone line. The time axis conversion takes 42 seconds for transmitting the one television signal corresponding to the field picture through the public telephone line. Such a long conversion time period of 42 seconds is a disadvantage of the prior art freeze-picture transmission apparatus. Another disadvantage is the difficulty in observing many field pictures simultaneously at a reception end.

SUMMARY OF THE INVENTION

It is, therefore, an object of the present invention to provide a freeze-picture transmission apparatus capable of transmitting a video signal corresponding to one field picture in a short time period.

Another object of the present invention is to provide a freeze-picture transmission apparatus in which four different standstill pictures can be simultaneously observed at a reception end.

The freeze-picture transmission apparatus of the present invention accomplishes these and other objects by first receiving a first video signal representing one field of a first picture among four pictures, compressing the first video signal in a half length in the horizontal direction of the picture and in a half length in the vertical direction of the picture so that the signal value of the first picture becomes a quarter of that of original one, and storing the compressed first video signal into a first quarter area of a video memory having a storage capacity corresponding to one field of the original picture. This storage operation may be done in 1/60 second (NTSC system). Simultaneously or immediately thereafter, the compressed first video signal is read-out from the first quarter memory area at a low speed corresponding to a bandwidth of a transmission line and transmitted through the narrow band transmission line through a modulator. If the public telephone line is used as the transmission line, the first video signal, that is, the first picture, may be transmitted in about 10 seconds, a quarter of the time required to transmit one field of an original picture, because the first video signal is compressed to a quarter. The reception side, on receipt of the compressed first video signal, stores it in a first quarter area of a field memory. Read-out of the field memory on the reception side is performed in the usual manner with respect to the whole memory area rather than a particular quarter area, and the read-out signal from the whole memory area is displayed on a screen which may be used to monitor the compressed video. During this transmission of the first video signal the transmission side, a second video signal representing one field of a second picture among the four pictures is compressed to a quarter and stored in a second quarter area of the video memory, and the compressed second video signal is read out therefrom and transmitted at the low speed. In this manner, the four video signals are sequentially stored and transmitted. Therefore, four different pictures can be simultaneously observed on a monitor screen and respective ones of four pictures can be transmitted in a short period.

According to the present invention, there is provided a freeze-picture transmission apparatus which comprises, on the transmission side, means for selecting sequentially one of four input video signals, an A/D converter for converting the video signals delivered from the selecting means into digital video signals, first memory means for storing the digital video signals, means for producing write-in addresses by which the four digital video signals are stored into predetermined areas of the first memory means, respectively, while compressed in the horizontal and vertical directions, address producing means for producing read-out addresses by which the compressed digital video signals stored in the first memory means are read out at a speed corresponding to the bandwidth of a transmission line means for modulating the compressed video signals read-out from the first memory means for transmission, and means for producing a control code to be transmitted through which designates the selection of the selecting means and the predetermined area of the first memory means.

The freeze-picture transmission apparatus according to the present invention comprises, on the reception side second, memory means for storing the compressed digital video signal, means for producing write-in addresses by which the compressed digital video signals transmitted through the transmission line are stored in the area of the second memory means designated by the transmitted control code, means for producing read-out addresses at television scanning speed by which the compressed digital video signals are read out from the second memory means, and a D/A converter for converting the compressed digital video signals read out from the second memory means into an analog video signal.

BRIEF DESCRIPTION OF THE DRAWINGS

FIG. 2 shows schematically a monitor screen at the transmission end for explaining the operation of the present invention;

FIG. 7 shows a format of a control code according to the present invention; and

DESCRIPTION OF THE PREFERRED EMBODIMENT

Figure 1:
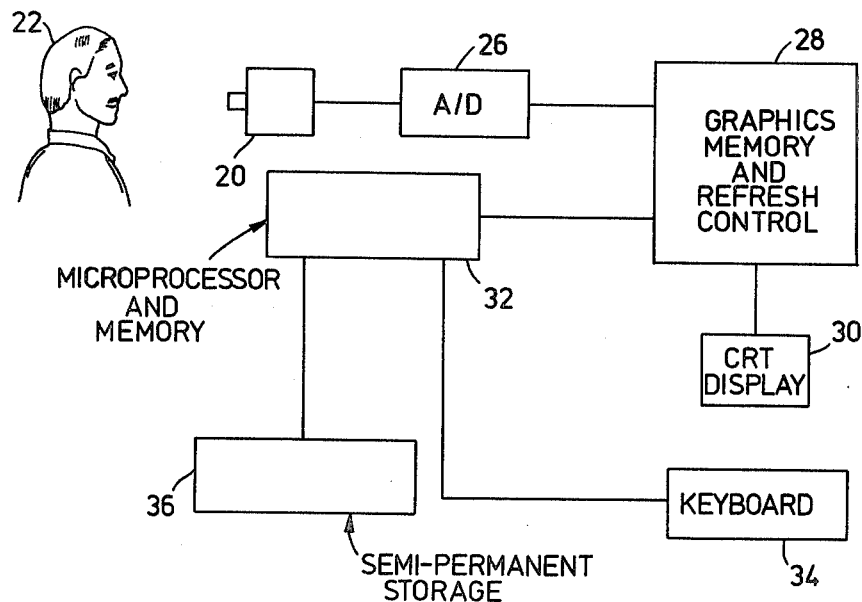
FIG. 1 is a block diagram showing a transmission unit of an embodiment according to the present invention.

Referring to FIG. 1, a switching circuit 1 receives four input video signal $I_1$ to $I_4$ and cyclically selects one at a time in accordance with a control signal from control circuit 6. The video signal selected by the switching circuit 1 is fed through a low-pass filter 2 and a clamping circuit 4 to an A/D converter 5. The video signal from the filter 2 is also fed to a synchronizing signal separator 3, in which the synchronizing signal is extracted and fed to the clamping circuit 4, the control circuit 6 and a clock generator 7. The video signal is converted into parallel 8-bit digital data by the A/D converter 5. The digital data is then stored in a memory 8 under the control of an address signal delivered from an address generator 9. In the present invention, a special address control is required to sequentially write the digital data of the video signals correspondig to four picture fields, while being compressed, into the memory 8. This address control will be described in more detail hereinafter. The video signals thus stored in the memory 8 are read out for the respective fields at a low speed and transmitted through a D/A converter 11 and a modulator 13 to a transmission line 1. On the other hand, the video signals for monitoring are read out at a television scanning speed and they are fed through a D/A converter 10 and an amplifier 12 to a monitor output terminal m.

The operation of the present invention will now be described with reference to FIG. 2, which shows the monitor picture on a monitoring screen at the transmitting end. This picture is divided into four areas 101 to 104 as shown. The input video signals $I_1$, $I_2$, $I_3$ and $I_4$ selected cyclically by the switching circuit 1 are compressed in the horizontal and vertical directions and are distributed to the areas 101, 102, 103 and 104. The renewals of the contents of the memory 8 are effected by the switching of inputs $I_1$ to $I_4$ and the writing of the same into the memory 8 after the contents are transmitted to the transmission line 1 at the low speed.

Figure 3:
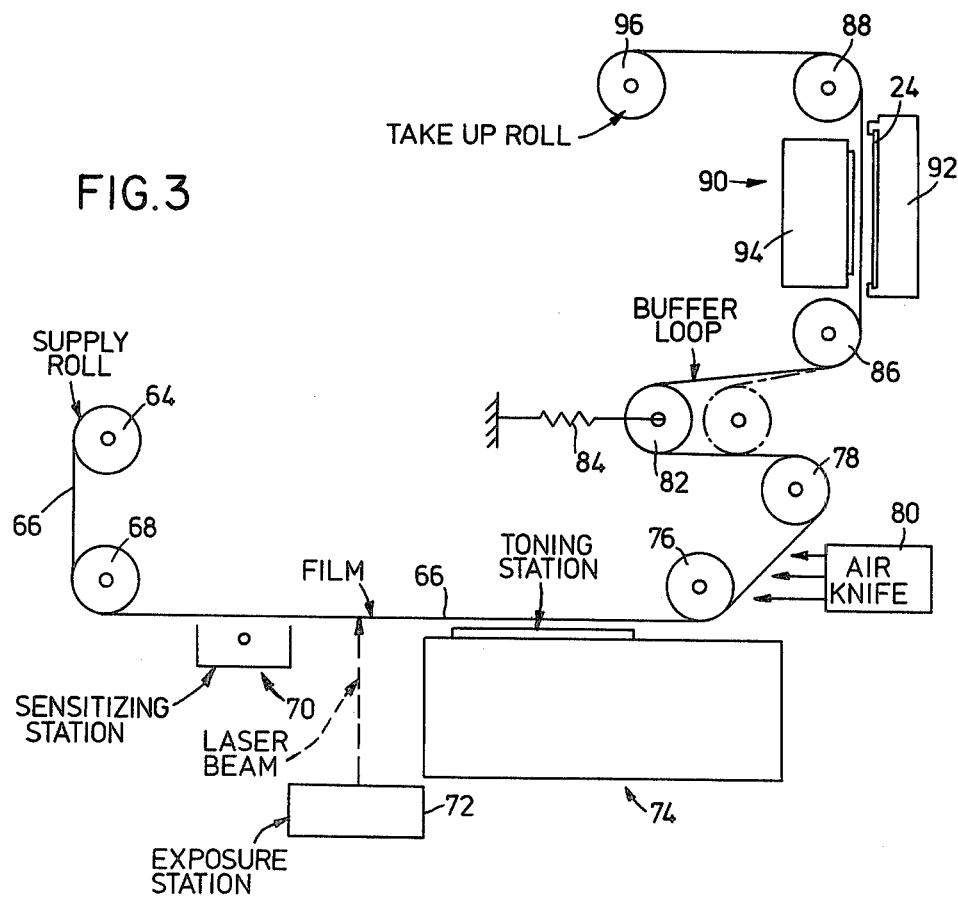
FIG. 3 is a circuit diagram of a memory shown in FIG. 1.
Figure 3:
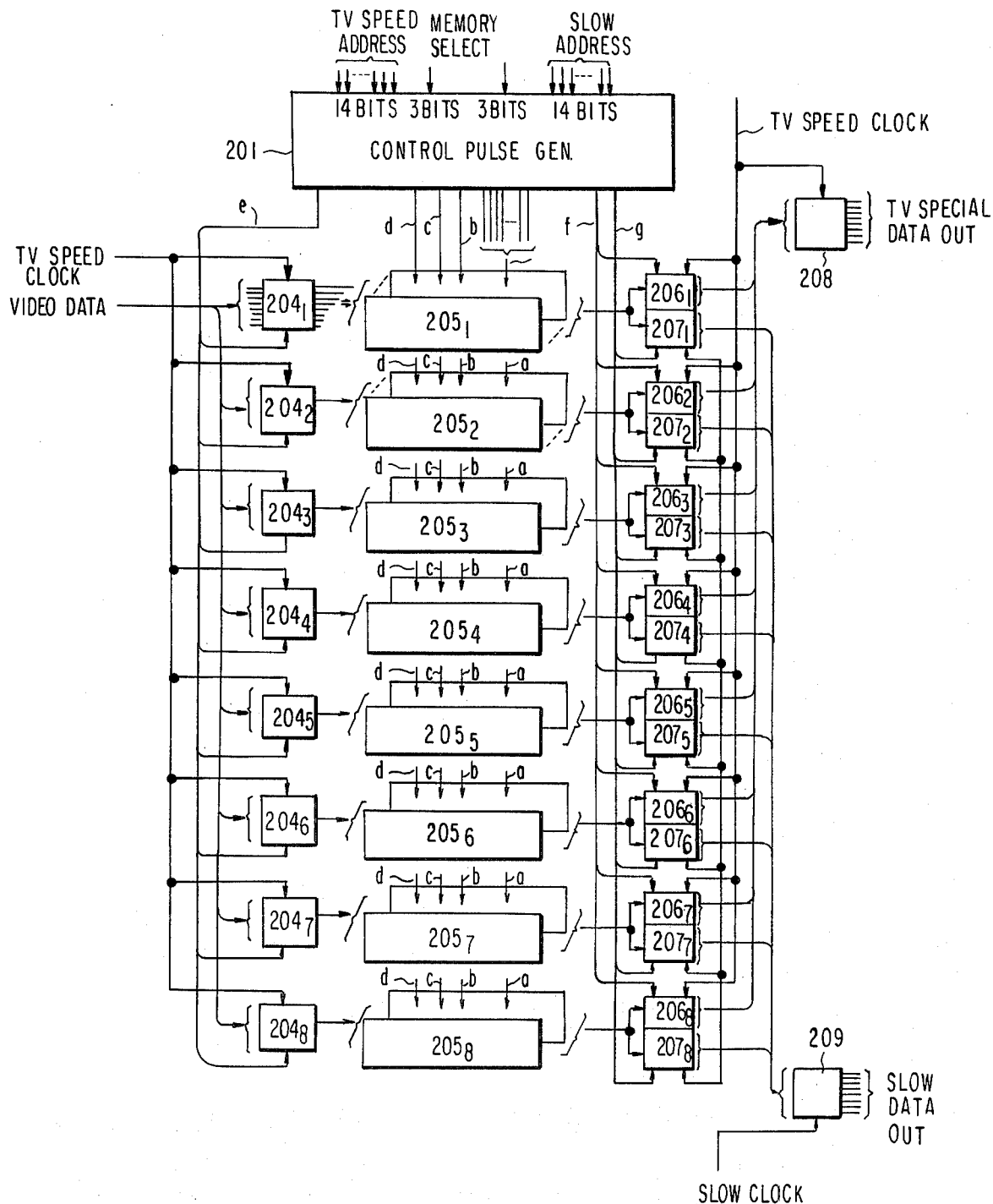

Next, the memory 8 shown in FIG. 1 will now be explained with reference to FIG. 3. In this embodiment, the number of samples in one horizontal period is defined to be 640, and therefore, the sampling frequency is determined as 10.08 MHz (15750×640). The horizontal and vertical scanning periods contain blanking periods which correspond to 128 samples and 22 lines, respectively. Consequently, the number of effective samples and lines excluding those in the blanking periods in the horizontal and vertical directions are 512 and 240, respectively. In FIG. 3, eight RAMs of 16 Kbits arranged in parallel constitute one group 205 so that the eight RAMs can store the respective bits of the parallel 8-bit data. Those eight memory groups are arranged in the longitudinal direction (as indicated at $205_1$ to $205_8$). In the present embodiment, the memory capacity required is 983.04 Kbits (512×240×8), which is smaller than the actual capacity of 1,048.576 Kbits. The digital video signals are fed through registers 204 to the respective memory groups $205_1$ to $205_8$. The memory groups $205_1$ to $205_8$ are composed of the RAMs of 16 Kbits and are accessed by column addresses of 7 bits generated from the control pulse generator 201 and low addresses of 7 bits. The data, which is read out of the memory groups $205_1$ to $205_8$ at the television scanning speed (10.08 MHz) for monitoring, is fed through registers $206_1$ to $206_8$ and a latch circuit 208 to the D/A converter 10 (FIG. 1). The data, which is read out at the low speed in accordance with the bandwidth of the transmission line, is fed through registers $207_1$ to $207_8$ to the latch circuit 209. These registers $207_1$ to $207_8$ and the latch circuit 209 are driven by the clocks at the low speed (3,150 Hz). These clocks are prepared by the clock generator 7 (FIG. 1).

Figure 4:
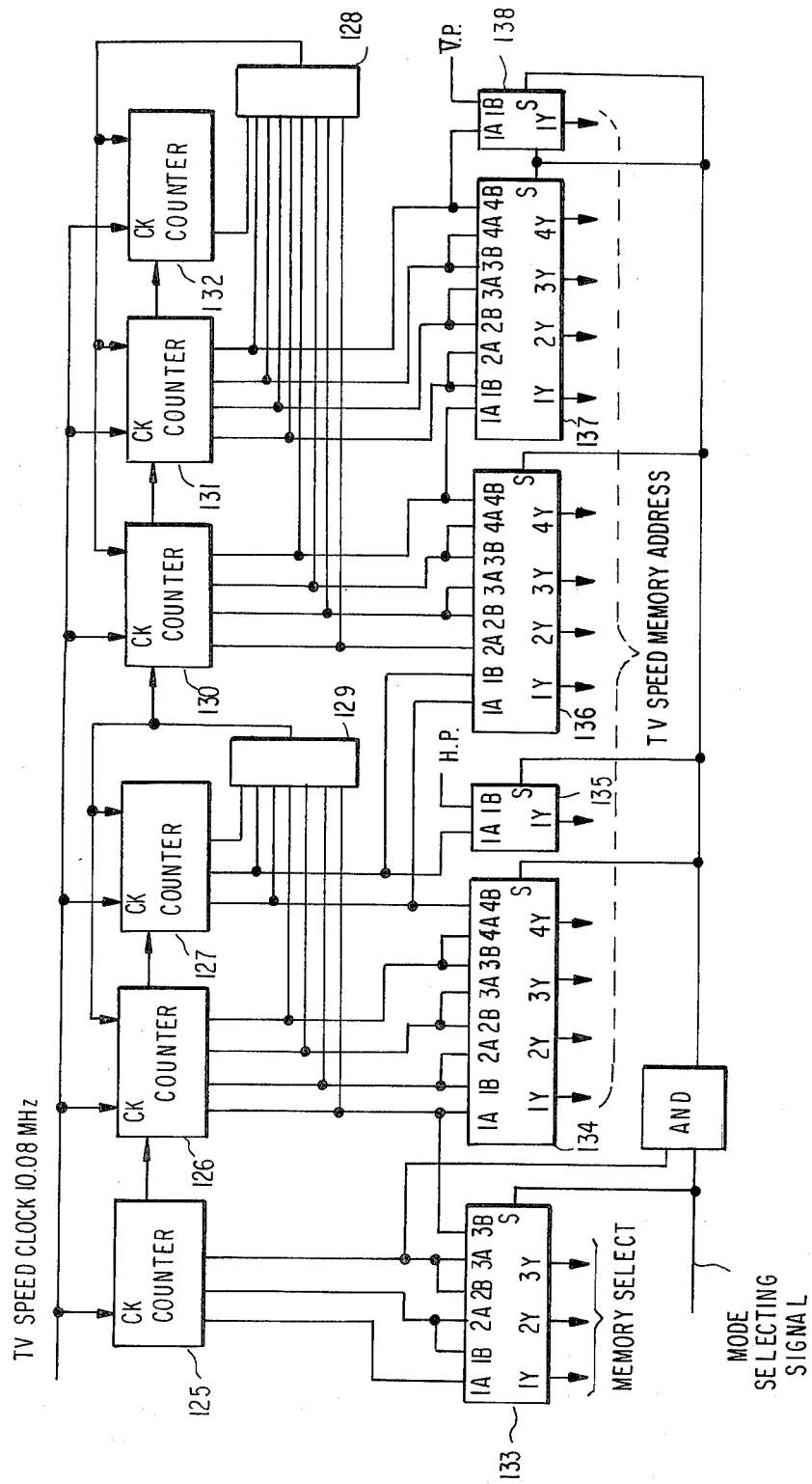
FIG. 4 is a circuit diagram of a write-in address circuit shown in FIG. 1 which produces write-in addresses in accordance with the television scanning speed.

FIG. 4 is a circuit diagram showing a part of the address signal generator which produces address signals at the television speed for controlling the writing of the digital video signal in the memory 8 and for controlling the reading of the digital signals monitoring. The horizontal address counter is composed of counters 125, 126 and 127 for receiving the television scanning speed clocks of 10.08 MHz. The counters 125 and 127 are 3 bit stage counters and the counter 126 is a 4 stage counter. The counter 125 produces its carrier output to be fed to the carrier input terminal of the counter 126. The carrier output of the counter 126 is fed in turn to the counter 127. When a decoder 129 detects that the horizontal address counter counts 640 clocks, it clears the counters 126 and 127 and provides an input to a counter 130. A vertical counter is composed of a 4 stage counter 131 and a single stage counter 132 and the 4 stage counter 130. A decoder 128 clears the counters 130, 131 and 132 when it detects that the vertical counter counts 262 scanning lines.

Data selectors 133, 134, 135, 136, 137 and 138 have their input and output terminals connected, as shown, to the counters 125, 126, 127, 130, 131 and 132 and the control pulse generator 210 of FIG. 3. Their terminals A are selected when their control terminals S are at low level, whereas their terminals B are selected when their control terminals S are at a high level. The control terminal S of the data selector 133 is fed directly from the control circuit 6 (FIG.1) with a mode selecting signal between a full picture transmission (i.e., the low level) and a four compressed picture transmission (i.e., the high level), whereas the other data selectors 134, 135, 136, 137 and 138 are fed with the AND output of the mode selecting signal and the third bit output of the counter 125. As a result, for full picture transmission, the control terminals S are at the low level so that those data selectors have their terminals A selected to receive their inputs. For the four compressed picture transmission the levels at the control terminals S are reversed at the timing of the third output of the counter 125 so that the terminals A and B receive their inputs. The input terminals B of the data selectors 135 and 138 are fed with position signals.

The position signals H.P. and V.P. indicate the position of memory areas where the compressed video signals are stored. In this embodiment, the position signals H.P. and V.P. correspond to the position of the four compressed pictures shown in FIG. 2. In FIG. 2, the areas 101, 102, 103 and 104 correspond to the codes (0, 0), (0, 1), (1, 0) and (1, 1), respectively, which are defined by the code (V.P., H.P.). More specifically, the high level of the position signal H.P. means the right-hand side in the horizontal direction, whereas the high level of V.P. means the lower side in the vertical direction.

The 3-bit outputs of the data selector 133 are the selecting signals of the memory groups $205_1$ to $205_8$ shown in FIG. 3. Moreover, the outputs of the data selectors 134 and 135 and the lower 2 bits of the data selector 136 constitute the column addresses, whereas the remaining outputs of the data selectors 136, 137 and 138 constitute the row addresses. Since the data selectors 134, 135, 136, 137 and 138 are switched by the control of the most significant bit delivered from the counter 125, two video signals corresponding to a pair of adjacent samples are applied to the same memory cell. Consequently, only one video signal corresponding to the latter sample of the pair is stored in the memory cell. In this embodiment of the present invention, the compression of the video signal, i.e., the compression of the video picture is performed by this double signal application to the same memory cell.

Figure 5:
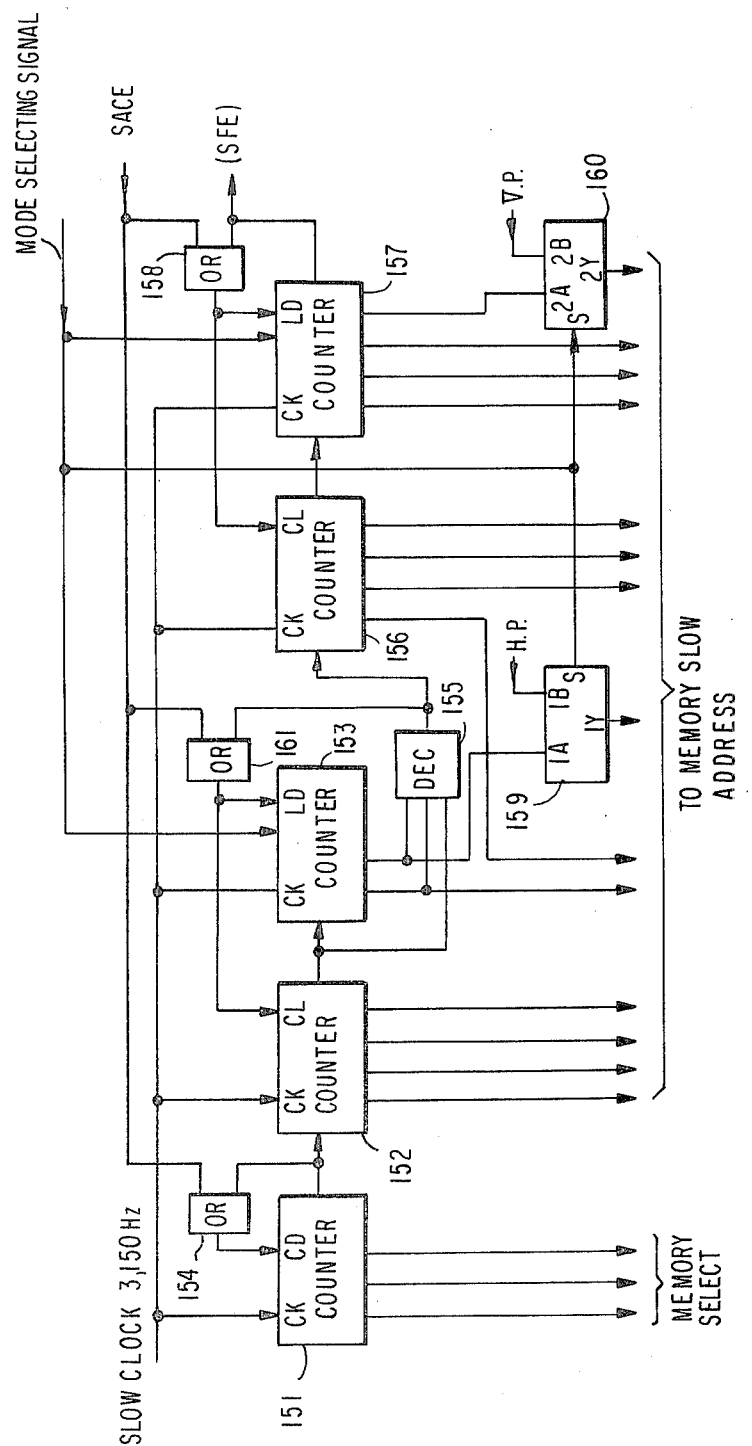
FIG. 5 is a circuit diagram of another write-in address circuit shown in FIG. 1 which produces write-in addresses at a slow speed in accordance with the transmission speed.

FIG. 5 shows another part of the address generator which produces read-out the digital video signal stored in addresses at a low speed for reading out the memory 8 (FIG. 1). A horizontal address counter is composed of counters 151, 152 and 153. The output of counter 151 provides the selecting signal for selecting the memory groups $205_1$–$205_8$ (FIG. 3). An OR gate 154 clears the counter 151 whenever there is a carrier output of the counter 151 or a slow address clearing enable (SACE) signal. A decoder 155 detects when the horizontal address counter reaches a count of 512 effective samples number of 512 and provides a detection signal to a carrier input terminal of a counter 156 and to an OR gate 161. The OR gate 161 clears the counter 152 in response to the output of the decoder 155 or the slow address clearing enable (SACE) signal.

Furthermore, the output of the OR gate 161, in conjunction with the mode selecting signal, loads the counter 153 with a count-value of 256 when the mode selecting signal indicates the four compression picture transmission mode and with a count-value of zero when the mode selecting signal indicates the full picture transmission mode.

The vertical address counter is composed of counters 156 and 157 and counts 240 lines. An OR gate 158 clears the counter 156 whenever there is a carrier output from the counter 157, which is defined as a slow field end (SFE) signal, or a slow address clearing enable (SACE) signal. The output of the OR gate 158 in conjunction with the mode selecting signal, also loads the counter 157 with a count-value of 120 when the four compressed picture transmission mode is selected and with a count-value of zero when the full picture transmission mode is selected. Data selectors 159 and 160 have their input and output terminals connected as shown. When their control terminals S are at a low level, i.e., the full picture transmission mode is selected, and terminals A of the data selectors 159 and 160 are selected. While, terminals B of the data selectors 159 and 160 are selected, when their control terminals S are at a high level, i.e., the four compressed picture transmission mode is selected. Moreover, the data selectors 159 and 160 have their B inputs fed with the video position signals H.P. and V.P., respectively.

The operation of the four compressed picture transmission mode will now be described with reference to FIG. 5. The horizontal counter and the vertical counter count the numbers from 256 to 512 and the numbers from 120 to 240, respectively, thereby to provide read out addressing corresponding to the second half of the horizontal lines in the lower half of the field. Since the data selectors 159 and 160 selects their terminals B, the horizontal read-out addresses change from 0 to 255 whereas the vertical read-out addresses change from 0 to 119 if the position signals H.P. and V.P. are at "0". If these position signals H.P. and V.P. are at "1", on the contrary, the horizontal and vertical read-out addresses change from 256 to 511 and from 120 to 239, respectively. Those position signals H.P. and V.P. are so produced in the control circuit 6 (FIG. 1), each time one of the four compressed pictures, i.e., the one quarter memory area, is fed out that they are shifted in response to the SFE signal. Although the upper limit of the frequency of the clock pulses to be used in the slow read-out address generator shown in FIG. 5 is determined by the frequency transmittable through the transmission line, a frequency of 3,150 Hz, i.e., one fifth of the horizontal synchronization frequency of 15,750 Hz may be used as an example in the present embodiment. As a result, the slow read-out address is generated at a rate of once per five horizontal periods, and this timing is determined at the horizontal blanking period.

Referring to FIG. 3 again, a control pulse generator 201 arranges the signals generated in the address generators of FIGS. 4 and 5 as a 7 bit address a, a column address asigning signal b, a row address assigning signal c and a writing signal d, and feeds them to the memory groups $205_1$ to $205_8$. In the case of the memory system shown in FIG. 3, the column address of 7 bits and the row address of 7 bits are not supplied to the RAMs, simultaneously, but these two addresses are supplied alternately to them under the control of the address asigning signals b and c. In response to the writing signal d, the memory stores the input data in the area designated by the addresses. The memory is in the read-out mode during the remaining time period, whereby the monitor terminal m is fed with the video signals read out at the television speed. The control pulse generator 201 responds to the memory select signals delivered from the data selector 133 shown in FIG. 4 and the counter 151 shown in FIG. 5 to produce the write register select signal e for selecting one of the registers $204_1$ to $204_8$. Since, the slow read-out is performed once during five horizontal periods and during the horizontal blanking period, as described hereinbefore, the address signal a of 7 bits and the write register select signal e are switched at that timing. The control pulse generator 201 further produces register select signals f and g from the memory select signals for selecting one of the registers $206_1$ to $206_8$ and $207_1$ to $207_8$ from which the data are read out.

Figure 6:
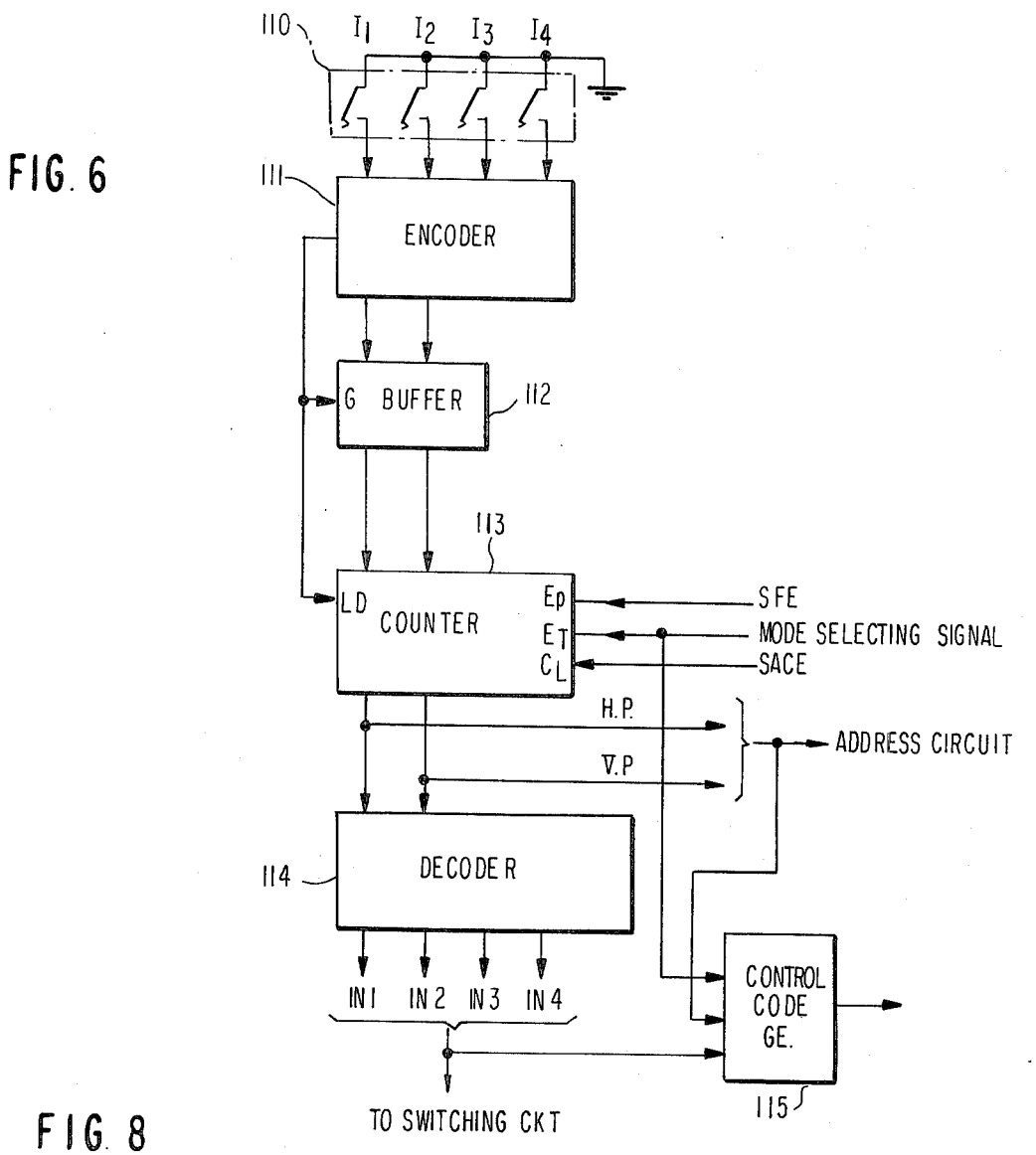
FIG. 6 is a circuit diagram of a control circuit shown in FIG. 1.

FIG. 6 is a circuit diagram showing the construction of the control circuit 6 shown in FIG. 1 which produces both the position signals V.P. and H.P. of the four compressed pictures and a switching signal to be fed to the switching circuit 1 (FIG. 1). In FIG. 6, the output from the switch 110 showing the selection of four inputs $I_1$, $I_2$, $I_3$ and $I_4$ is fed to an encoder 111 to be converted to a binary code of 2 bits. This binary code is fed through a buffer 112 to a counter 113 and loaded upon the counter 113 when the full picture transmission mode is selected. The output of the counter 113 is converted in a decoder 114 into a signal for controlling the switching circuit 1. The counter 113 is fed with two kinds of enable signals, i.e., the slow field end (SFE) signal, at the terminal $E_p$ which is the carrier output of the counter 157 (FIG. 5) and a mode selection signal, at the terminal $E_T$ which indicates one of full-picture transmission and the four compressed picture transmission modes. As a result, when the four compressed picture transmission is selected, the counter 113 is counted up each time it receives the SFE signal, i.e., each time the transmission of one of the four compressed pictures is completed, so that the switching circuit 1 may switch over the subsequent video signal. Further, the output of the counter 113 is fed as the position signals V.P. and H.P. to the data selectors 135 and 138 (FIG. 4) and 159 and 160 (FIG. 5). Those position signals V.P. and H.P. are applied to assign the write-in and read-out positions of the memory 8. Moreover, the counter 113 is fed with the slow address clearing enable signal (SACE), which indicates the start of the four compressed picture transmission, as the clearing pulse.

The control circuit 6 shown in FIG. 1 contains a circuit 115, which produces the control code to be transmitted to the receiving end. The control code used in the present embodiment is composed of 18 bits, as shown in FIG. 7. In this control code, the first four bits indicate the input selected from the four inputs $I_1$, $I_2$, $I_3$ and $I_4$, the fifth and sixth bits the discrimination between the full and four compressed picture transmissions, the seventh and eighth bits the position signals H.P. and V.P., the ninth to twelfth bits blank codes, and the thirteenth to eighteenth bits a head code which repeats the pair of "1" and "0". The picture information data are transmitted after the transmission of the control code. The control code is supplied to the modulator 13 (FIG. 1) as serial data. The control code is produced from the output of the counter 114, the position signals H.P. and V.P. from the counter 113, and the mode selecting signal indicating the full or four compressed pictures transmission modes.

In FIG. 1, the address generator 9 also produces a cursor signal for displaying a cursor line shown in FIG. 2 which indicates what portion of the compressed picture is being transmitted at the present moment. The cursor signal is supplied through the amplifier 12 to the monitor. It is produced by comparing the slow-speed and high-speed vertical addresses and preparing a bright or dark video signal having a predetermined width and thickness.

Figure 8:
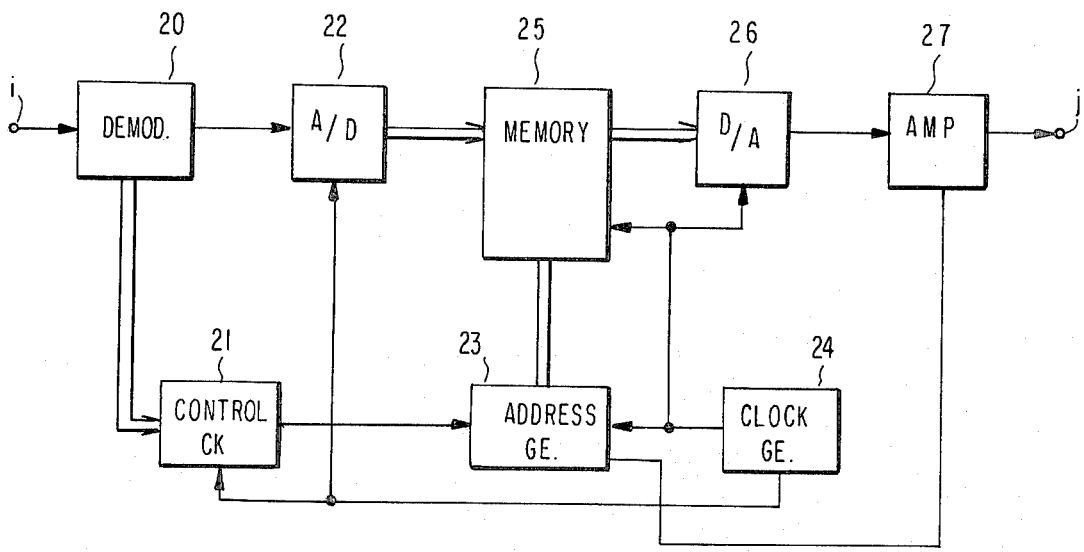
FIG. 8 is a block diagram of the reception unit of an embodiment according to the present invention.

FIG. 8 is a block diagram showing a reception unit, in which: letters i and j indicate a line input terminal and a line output terminal, respectively; and numerals 20, 21, 22, 23, 24, 25, 26 and 27 indicate a demodulator, a control circuit, a slow speed A/D converter, an address generator, a clock generator, a memory circuit, a television speed D/A converter and an amplifier, respectively. The modulated signal transmitted to the line input terminal i is demodulated by the demodulator 20. The control code located at the head of the transmitted signal is fed to the control circuit 21. The constructions of the memory 25 and the address generator 23 of the reception unit may be made similar to those of the transmission unit. The address generator 23 has two circuit portions similar to the circuits shown in FIGS. 4 and 5. A write-in address signal synchronized with the clock of 3,150 Hz is produced in the circuit similar to the circuit shown in FIG. 5, whereas a read-out address signal synchronized with the clock of 10.08 MHz is produced in the circuit portion similar to the circuit shown in FIG. 4. The control circuit 21 extracts the position signals H.P. and V.P. from the control code and supplies them to the address generator 23.

What is claimed is:

1. A freeze-picture transmission apparatus comprising:

an input means receiving four video signals representing four pictures for selecting a first of said four video signals;

a memory means having four areas collectively corresponding to one full TV screen;

a write-in means coupled to said input means and said memory means for compressing the selected video signal delivered from said input means and writing the compressed, selected video signal into one of said four areas of said memory means;

a first read out means for reading out the selected video signal from one of said four areas of said memory means at a speed corresponding to a frequency equal to or lower than an upper limit of a transmittable frequency of a transmission line;

a first transmission means for transmitting the selected video signal read out by said first read-out means to the transmission line;

a second read-out means for reading out the content of all the four areas of said memory means at a television scanning speed;

a second transmission means for transmitting the output of said second read-out means to a monitoring screen;

means for producing a cursor signal indicating what portion of said memory means is being transmitted; and means for supplying said cursor signal to the monitoring screen.

2. A freeze-picture transmission apparatus as claimed in claim 1, wherein said input means selects a second of said four video signals after said first tranmission means transmits the selected first video signal.

3. A freeze-picture transmission apparatus as claimed in claim 1, wherein the selected video signal stored in said memory means is read out after said selected video signal has been written into said memory means.

4. A freeze-picture transmission apparatus for transmitting video signals over a transmission line having a bandwidth, said apparatus comprising:

means for receiving a plurality of video signals for sequentially selecting one of them;

means for converting the video signals delivered from said selecting means into digital video signals;

memory means;

means for producing a plurality of write-in addresses corresponding to said plurality of video signals;

means for writing said digital video signals with compression into respective areas of said memory means determined by said plurality of write-in addresses;

means for sequentially producing a plurality of read-out addresses corresponding to said plurality of video signals;

means for reading out the compressed digital video signals one after another, from areas of said memory means determined by said plurality of read-out addresses, at a speed corresponding to a bandwidth of said transmission line;

means for transmitting to the transmission line the compressed digital video signals read-out from said memory means;

first additional means for producing another read-out address;

a monitoring display having a television scanning speed;

second additional means for reading out at said television scanning speed a composite picture designated by said another read-out address and including the compressed video signals stored in said memory means;

third additional means for supplying said composite picture read out from said memory means to said monitoring display;

fourth additional means for producing a cursor signal indicating what portion of the compressed video signals is being transmitted; and fifth additional means for supplying said cursor signal to monitoring display.

5. A freeze-picture transmission apparatus as claimed in claim 4, wherein said selecting means selects another of said plurality of video signals after said transmitting means transmits one compressed video signal.

6. A freeze-picture transmission apparatus as claimed in claim 4, wherein one compressed digital video signal stored in said memory means is read out for transmission to said transmission line after one video signal supplied to said selecting means is stored in said memory means.

7. A freeze-picture transmission apparatus as claimed in claim 4, wherein said selecting means receives four video signals and selects one from said four video signals, and said memory means has four areas each of which stores one of said four video signals.

8. A freeze-picture transmission system comprising:

a transmission line having an upper limit of transmittable frequency;

a transmission unit including: means for sequentially receiving a plurality of video signals in a predetermined order, first receiving means for compressing the video signals received by said first receiving means, means for storing said compressed video signals, means for reading out said compressed video signals one by one from said storing means at a speed corresponding to a frequency equal to or lower than said upper limit of said transmission line, means for feeding said compressed video signals read-out from said storing means to said transmission line, a monitoring display, first additional means for reading out a composite video picture including the compressed video signals stored in said storing means at a speed corresponding to the scanning speed of said monitoring display, second additional means for feeding said composite video picture read-out from said first additional means to said monitoring display, third additional means for producing a cursor signal indicating what portion of the compressed video signals is being transmitted by said feeding means; and fourth additional means for feeding said cursor signal to said monitoring display; and a reception unit including: second receiving means for receiving said compressed video signal from said transmission line, a memory storing said compressed video signal received by said second receiving means, means for deriving said compressed video signal from said memory, and means for displaying said compressed video signal derived from said deriving means.

9. A freeze-picture transmission apparatus as claimed in claim 8, wherein said first receiving means receives a second of said plurality of video signals after said feeding means feeds a first compressed video signal.

10. A freeze-picture transmission apparatus claimed in claim 8, wherein one compressed video signal stored in said storing means is read-out for transmission to said transmission line after one video signal supplied to said receiving means is stored in said storing means.

* * * * *

UNITED STATES PATENT AND TRADEMARK OFFICE
CERTIFICATE OF CORRECTION

PATENT NO. : 4,467,355

DATED : August 21, 1984

INVENTOR(S) : Akio MATSUDA

It is certified that error appears in the above-identified patent and that said Letters Patent is hereby corrected as shown below:

Column 1, line 24, delete "one";

line 24, insert --one-- after "the".

Column 3, line 68, change "low" to --row--.

Column 4, line 35, change "210" to --201--.

Column 5, line 17, delete "the digital video signal stored in";

line 18, after "out" insert --the digital video signal stored in--;

line 27, delete "number of 512";

line 65, delete "addressing" and insert --addresses--.

Column 6, line 23, "asigning" should be --assigning--;

line 30, "asigning" should be --assigning--;

Signed and Sealed this

Twenty-third Day of April 1985

[SEAL]

Attest:

DONALD J. QUIGG

*Attesting Officer*  *Acting Commissioner of Patents and Trademarks*